United States Patent [19]
Yamamoto et al.

[11] Patent Number: 5,376,304
[45] Date of Patent: Dec. 27, 1994

[54] CERIC OXIDE SOL

[75] Inventors: Shin Yamamoto; Yoichi Oka; Hiroshi Nishikura, all of Kakogawa, Japan

[73] Assignee: Taki Chemical Co., Ltd., Kakogawa, Japan

[21] Appl. No.: 851,695

[22] Filed: Mar. 13, 1992

[30] Foreign Application Priority Data

Mar. 28, 1991 [JP] Japan ................... 3-091226

[51] Int. Cl.$^5$ ................ B01J 13/00; C01F 17/00
[52] U.S. Cl. ................... 252/309; 106/286.1; 106/287.18; 106/287.29; 423/21.1; 423/263; 252/588
[58] Field of Search ............ 252/313.1, 308, 309, 252/588; 106/286.1, 287.18, 287.29; 423/21.1, 263

[56] References Cited

U.S. PATENT DOCUMENTS

| | | | |
|---|---|---|---|
| 3,453,131 | 7/1969 | Fadner | 252/313.1 |
| 4,529,410 | 7/1985 | Khaladji et al. | 423/263 |
| 4,545,923 | 10/1985 | Gradeff et al. | 252/309 |
| 4,699,732 | 10/1987 | Woodhead | 252/313.1 |
| 4,799,963 | 1/1989 | Basil et al. | 106/287.18 |

FOREIGN PATENT DOCUMENTS

| | | | |
|---|---|---|---|
| 1-148710 | 6/1989 | Japan | |
| 1-306435 | 12/1989 | Japan | |
| 1230632 | 5/1971 | United Kingdom | 423/263 |
| 1233191 | 5/1971 | United Kingdom | 423/21.1 |

OTHER PUBLICATIONS

*Hawley's Condensed Chemical Dictionary*, 11th Edition (Van Nostrand Reinhold Company, NY 1987) p. 1071.

*Primary Examiner*—Robert L. Stoll
*Assistant Examiner*—Daniel S. Metzmaier
*Attorney, Agent, or Firm*—Armstrong, Westerman, Hattori, McLeland & Naughton

[57] ABSTRACT

As an ultraviolet absorbent material, ceric oxide sol which can be widely used in many fields using various solvent materials is obtained.

An anionic aqueous sol is obtained by adding phosphoric acid and/or phosphate to cationic ceric oxide sol. It is a sol that can be applied to an emulsion paint. By further adding a cationic surface active agent to this sol, an organo-ceric oxide sol that can be applied to various organic solvents is formed.

This sol may widely be used in utilities using various organic solvent materials, such as paint materials.

3 Claims, No Drawings

CERIC OXIDE SOL

This invention relates to ceric oxide sol. More specifically, it relates to ceric oxide sol having an average particle diameter of 500 Å or less and containing phosphoric acid and/or phosphate in a $P/CeO_2$ molar ratio of 0.05 to 1.0 and to ceric oxide sol having an average particle diameter of 500 Å or less and containing phosphoric acid and/or phosphate in a $P/CeO_2$ molar ratio of 0.05 to 1.0 and further containing 10 to 100% by weight based on $CeO_2$ of a cationic surface active agent. For example, by using the sol of this invention as a coating agent for glass and polymeric films etc., and an additive for polymeric materials and paints, it develops excellent ultraviolet absorptive effect.

Heretofore, compounds such as titanium dioxide, chromic oxide, iron oxide, cerium oxide and vanadium oxide have been used as ultraviolet absorbers, and ultraviolet absorptive glass etc. are produced by adding a powder of these compounds. However, when these powdery compounds are used as an additive to obtain the desired ultraviolet absorptive effect, the inclusion of a large amount of the additive becomes necessary and the cost becomes high. Furthermore, because the glass is colored, the utility of the resulting product is limited.

To solve this problem, recently a PVD method (physical vapor deposition) and a CVD method (chemical vapor deposition) are proposed to deposit the above ultraviolet absorbent material on the glass surface. But according to the PVD method, since a thin metal film of absorbing visible lights is formed on the surface of the glass, the light transmission properties of the coated glass would extremely lower so that the glass would be poor in light transmission. On the other hand, where the CVD method is used, since the raw materials to be used therein contain anhydrous metal chlorides or sublimable substances, a corrosive chlorine gas is generated at the time of vapor deposition. Further, since vapor deposition is carried out in a closed oven at a high temperature, it is difficult to control concentration of vapor gas and it is difficult to obtain a uniform thin film. A further defect is that the apparatus used at this time becomes large-sized and the cost of production becomes high.

On the other hand, recently there is a strong desire to impart ultraviolet absorbing ability to automobile glass etc. and surface processing technology of large-sized glass more than in the past is necessary. Thus, the aforesaid vapor deposition methods become more difficult to carry out and are more costly.

Accordingly, it is desired to develop a method of forming a uniform thin film on large-sized products at low costs in place of the CVD method or the PVD method.

Furthermore, for food packaging materials, organic ultraviolet absorbers are used to prevent photo-oxidative deterioration of plastics by ultraviolet rays and to prevent degeneration of food by them. But organic ultraviolet absorbers are toxic and inorganic ultraviolet absorbers are desired.

In view of these situations, the present inventors made extensive investigations to obtain an ultraviolet absorbent material having excellent light transmission properties, ultraviolet absorbing properties, and other good properties such as, dispersibility and coating properties in use of it. As a result, the present inventors found a sol of crystalline ceric oxide (Japanese Patent Kokai No. 148710/89), and proposed a method of ultraviolet absorption using this sol (Japanese Patent Kokai No. 306435/89).

However, as a result of further investigations, the present inventors found that when ceric oxide sol is added to an emulsion paint as an ultraviolet absorber, the sol is not soluble in the paint, but is separated from the paint and cannot be used.

Furthermore, the present inventors in the invention of the aforesaid Japanese Patent Kokai No. 306435/89 proposed an organo-ceric oxide sol dispersed in an organic solvent by adding an anionic surface active agent to cationic aqueous cerium oxide sol. However, when this organo-ceric oxide sol is applied to a room temperature curable paint, it causes viscosity increase and curing during storage of the paint, and a problem arises.

Since this room temperature curable paint is cured at room temperature generally using an isocyanate as a curing agent, it has reactive groups such as hydroxyl groups at the terminal of the polymer chain, and they would react with the organo-ceric oxide sol. Accordingly, an organo-ceric oxide sol which does not react with such a room temperature curable paint and has excellent storage stability when mixed with a paint is desired.

To solve this problem, the present inventors further investigated ceric oxide sol and as a result, found means for solving this problem. The present invention provides an unprecedented utility of an excellent ultraviolet absorber.

The present invention relates to ceric oxide sol having an average particle diameter or 500 Å of less and containing phosphoric acid and/or phosphate in a $P/CeO_2$ molar ratio of 0.05 to 1.0. Furthermore, the present invention relates to ceric oxide sol having an average particle diameter of 500 Å or less and containing phosphoric acid and/or phosphate in a $P/CeO_2$ molar ratio of 0.05 to 1.0 and further containing 10 to 100% by weight based on $CeO_2$ of a cationic surface active agent.

A first object of this invention is to provide ceric oxide sol having excellent stability to an emulsion paint and a dispersion paint.

A second object of this invention is to provide ceric oxide sol having excellent stability to room temperature curable paints, especially room temperature curable paints containing an isocyanate.

First, the ceric oxide sol of this invention having an average diameter of 500 Å or less and containing phosphoric acid and/or phosphate having a $P/CeO_2$ molar ratio of 0.05 to 1.0 will be described in detail.

In preparing the ceric oxide sol containing phosphoric acid and/or phosphate, the sol obtained by the method described in Japanese Patent Kokai No. 148710/89 filed before by the present inventors may be used as a starting material.

As regards the process for producing the sol of the invention, first phosphoric acid and/or phosphate is added to the ceric oxide sol so that the $P/CeO_2$ molar ratio is 0.05 to 1.0. When in this case, the concentration of an alkali metal ion such as $Na^+$ or $K^+$ or $NH^{4+}$ in the starting sol is high, the sol may get gelled according to the type of the phosphoric acid and/or phosphate used. But when the sol is gelled, the resulting gel may be revived to a sol with a desalting treatment by using an ultrafiltration apparatus.

The ceric oxide sol of this invention has very high thixotropic properties in a range of weak acid to neutral. Accordingly, when it is used in the above pH range, the $CeO_2$ concentration is preferably not more than 5% by weight from the point of workability. But in an alkaline range, the concentration may be as high as at least 20% by weight, and it is outstandingly advantageous in respect of workability.

The ceric oxide sol of the invention is very advantageous when it is used in an alkaline range, but its pH range is not particularly limited.

Examples of the phosphoric acid and/or phosphate used in such a process are ortho-phosphoric acid, condensed phosphoric acids and/or their alkali metal salts or ammonium salts.

Examples of the condensed phosphoric acids include pyrophosphoric acid, tripolyphosphoric acid, tetrapolyphosphoric acid, pentapolyphosphoric acid, hexapolyphosphoric acid, heptapolyphosphoric acid, octapolyphosphoric acid, nonapolyphosphoric acid, decapolyphosphoric acid, metaphosphoric acid, trimetaphosphoric acid, hexametaphosphoric acid, ultrapolyphosphoric acid, or their alkali metal salts or ammonium salts.

Examples of adjusters used to adjust pH include alkali metal hydroxides, aqueous ammonia, tetramethyl ammonium hydroxide, and water-soluble alkanolamines such as monoethanolamine.

The sol of this invention has an average particle diameter of 500 Å or less. Generally, a sol having an average particle diameter of more than 500 Å has a low transparency, and when it is used as a coating material, the resulting film causes turbidity. Therefore, when such a sol is used, it becomes like the use of a powder, and its use is restricted undesirably. The particle diameter as used in this invention refers to the particle diameter of a sol observed by a dynamic light scattering method under a dispersed state of the sol.

The concentration of the ceric oxide sol of the invention differs greatly depending upon the particle diameter, $P/CeO_2$ molar ratio and pH of the sol. But in the state of sol, it is substantially about up to 50% as $CeO_2$, and a further increase of the concentration would cause a very high viscosity of the sol so that the fluidity of the sol would be almost none.

The amount of phosphoric acid and/or phosphate based on ceric oxide is a $P/CeO_2$ molar ratio of 0.05 to 1.0. If this molar ratio is below 0.05, the storage stability of the sol for a long period of time becomes markedly low. If it exceeds 1.0, the ion concentration becomes high, and the sol causes pseudocoagulation. Thus, its apparent particle diameter becomes large so that the particles may settle undesirably.

Now, another embodiment of the invention, i.e., a ceric oxide sol having a particle diameter of 500 Å or less and containing phosphoric acid and/or phosphate in a $P/CeO_2$ molar ratio of 0.05 to 1.0 and further containing 10 to 100% by weight based on $CeO_2$ of a cationic surface active agent will be described in detail.

The sol of the invention is obtained by further adding a cationic surface active agent to the aforesaid sol containing phosphoric acid and/or phosphate. As a result, when the sol of the invention is added to a room temperature curable paint, both dissolve each other, and the resulting paint shows high stability.

Examples of the type of the cationic surface active agent used include primary amine-type cationic surface active agents such as octadecylamine acetate, secondary amine-type cationic surface active agents such as oxyethylenedodecylamine, tertiary amine-type cationic surface active agents such as polyoxyethylenedodecylamine, and quaternary ammonium salt-type cationic surface active agents such as dialkyldimethyl ammonium chlorides. Of these, the use of quaternary ammonium salt-type cationic surface active agents is most preferred from the viewpoint of solubility.

The most preferred quaternary ammonium salt-type cationic surface active agents are, for example, dialkyldimethyl ammonium chlorides, alkyltrimethyl ammonium chlorides, and alkyldimethyl benzyl ammonium chlorides. But they are not limited to these compounds.

As to the amount of the cationic surface active agent, in the same way as in the relation to the aforesaid $P/CeO_2$ molar ratio, as the particle diameter of the ceric oxide sol becomes large, the amount of the cationic surface active agent may be small. Conversely, if the particle diameter becomes small, the amount of the cationic surface active agent becomes large. Its amount is 10 to 100% by weight based on the amount of $CeO_2$ of ceric oxide. If the amount of the surface active agent is below 10% by weight, the dispersibility of the sol is markedly lowered. Or conversely, if the amount of the surface active agent is above 100%, the stability becomes poor.

One example of the method of producing the ceric oxide sol containing a cationic surface active agent is as follows: When the cationic surface active agent is added to ceric oxide sol containing phosphoric acid/or phosphate, a precipitate containing ceric oxide, phosphoric acid or a phosphate, and the cationic surface active agent is formed. This precipitate is filtered and dried, and an organic solvent to be described later is added to obtain ceric oxide sol containing the cationic surface active agent of the invention.

As an alternative, a cationic surface active agent is previously mixed well with an organic solvent, and ceric oxide sol containing phosphoric acid or phosphate is added thereto and well mixed. The water formed by phase separation is removed. This can also give the ceric oxide sol having the cationic surface active agent of the invention.

Examples of such organic solvents include hydrocarbons such as toluene, xylene, benzene, cyclohexane and chloroform, mixed solvents having a relatively high boiling point, higher alcohols such as propanol, butanol, cyclohexanol and pentanol, ketones such as methyl isobutyl ketone and cyclohexanone, esters such as butyl acetate, as well as tetrahydrofuran, turpentine oil, and petroleum ether.

When the sol of this invention is added to plastics, it may be dispersed in a plasticizer. In this case, the sol is uniformly dispersed in such a plasticizer as di-n-octyl phthalate, dioctyladipic acid, or n-butyl oleate. But when tricresyl phosphate or trimellitic acid derivatives are used, they are desirably used as dispersed in organic solvents.

As is clear from the above description, in a liquid already containing an organic solvent, such as an organic solvent-type paint, a dried product of a ceric oxide containing a cationic surface active agent is added to it to obtain a stable ceric oxide sol paint.

Examples of this invention are mentioned hereunder to further illustrate the present invention, but the present invention is not limited to them. Unless otherwise specified, all percentages are shown by weight.

EXAMPLE 1

50 kg ($CeO_2 = 2.0\%$) of an aqueous solution of ammonium ceric nitrate and 33.8 kg of an aqueous solution of sodium hydroxide (Na=1.5%) were added simultaneously under stirring from separate metering pumps over a period of about 1 hour to a reaction vessel to which 10 kg of water had been previously added. The temperature of the reaction liquid at this time was 21° C.

After the reaction, the resulting gel was filtered and washed with water to obtain a wet cake containing 17.33% of $CeO_2$, 0.3% of $NO_3$ and each not more than 20 ppm of Na and $NH_3$.

To 2000 g of the wet cake were added 1214 g of water and 252 g of hydrochloric acid (HCl=35%) to form a uniform slurry. It was heat-treated for 3 hours at 90° C. The slurry was whitely turbid, but when it was diluted with 1.2 liters of deionized water, a transparent sol formed. This sol was a cationic ceric oxide sol (conventional sol). The particle size distribution of the sol was measured with a sub-micron particle sizer (NICOMP 370 HPL-type of Pacific Scientific Instrument Div.) in accordance with a dynamic light scattering method. As a result, the sol had an average particle diameter of 50 Å.

Sodium pyrophosphate decahydrate was added in an amount of 38.4 g ($P/CeO_2$ molar ratio=0.50) to 600 g of this cationic ceric oxide sol ($CeO_2$=10%), and further, a 25% sodium hydroxide solution was added to adjust the pH of the sol to 9.5. As flocculated and became whitely turbid, it was desalted by using an ultrafiltration apparatus (SLP-1053 type of ASAHI CHEMICAL INDUSTRY CO., LTD.). It was further washed and concentrated to obtain a ceric oxide sol of the invention ($CeO_2$=20%, P=1.1%, $P/CeO_2$ molar ratio=0.31, pH 8.5).

EXAMPLE 2

10 kg of an aqueous solution of ceric sulfate acidified with sulfuric acid ($CeO_2$=8.0%, $SO_4$=25.0%) was added to 135 kg of an aqueous solution of sodium hydroxide (NaOH=2%) with stirring to form a gel. This gel was filtered and washed with water. This operation was fully repeated until $SO_4^{2-}$ ion was no longer detected in the washing to form a gel slurry of $CeO_2$ (10.5%).

Acetic acid (183 g) was added to 5000 g of the gel slurry, and the mixture was put in an autoclave and hydrothermally treated at 140° C. for 6 hours to obtain cationic ceric oxide sol (conventional sol). The sol had an average particle diameter of 150 Å.

To 5000g of this cationic ceric oxide sol ($CeO_2$=9.7%) was added 90.5 g of sodium hexametaphosphate ($P/CeO_2$ molar ratio=0.30). Furthermore, 500 g of a 25% aqueous solution of sodium hydroxide was added to adjust the pH to 9.5. The solution became whitely turbid, and therefore, it was desalted by using an ultrafiltration apparatus. Furthermore, it was washed and concentrated to give ceric oxide sol of this invention (pH9.2, $CeO_2$=20%, Na=0.6%, P=0.76%, $P/CeO_2$ molar ratio=0.21).

EXAMPLE 3

8 kg of Cerous carbide ($CeO_2$=50.5%) was dissolved in 148 kg of hydrochloric acid (HCl=2%), and 55 kg of a solution of sodium hydroxide (NaOH=10%) was added with stirring to perform the reaction. After the reaction, the resulting gel was filtered and washed. 1290 g of an aqueous solution of hydrogen peroxide ($H_2O_2$=31%) was added to the gel to convert the cerous gel into a ceric gel. Thereafter, it was filtered to obtain 16.2 kg of a wet cake ($CeO_2$=24.5%).

5200 g of hydrochloric acid (HCl=2%) was added to 1000 g of the wet cake, and the mixture was stirred and aged for 24 hours at room temperature to obtain a sol-like liquid.

Since this sol-like liquid was whitely turbid, it was washed by an ultrafiltration apparatus to obtain 1515 g of cationic ceric oxide sol ($CeO_2$=9.8%, conventional sol).

The yield of this sol was 60% and its average particle diameter according to a dynamic light scattering method was 25 Å.

To 1000 g of the ceric oxide sol, 58 g of sodium hexametaphosphate was added so that the $P/CeO_2$ molar ratio became 1.0. Furthermore, monoethanolamine was added to adjust the pH of the solution to 10.0. Therefore, the mixture was washed and concentrated by using an ultrafiltration apparatus to give ceric oxide sol of the invention (pH 9.5, $CeO_2$=7.7%, P=1.3%, $P/CeO_2$ molar ratio=0.94).

EXAMPLE 4

100 g of the ceric oxide sol ($CeO_2$=20%) of the invention obtained in Example 1 was diluted with water to 1000 g. To the diluted product, 20.5 g of quaternary ammonium salt-type cationic surface active agent, dodecylbenzyldimethylammonium chloride (CATION F2, product of NIPPON OIL & FAT CO., LTD., effective component 50%) was added to obtain a precipitate.

This precipitate was filtered and washed, and dried at a temperature of 100° C. This dried product contained 66.3% of $CeO_2$, 3.4% of P and 23.1% (34.8% based on $CeO_2$) of dodecylbenzyldimethylammonium. Dispersion of the dried product in toluene yielded an organo-ceric oxide sol ($CeO_2$=20%) of this invention.

Five parts of the organo-ceric oxide sol of the invention was added to 100 parts of a room temperature curable fluorine resin paint (LUMIFLON LF-200, OH value 32, product of ASAHI GLASS CO., LTD.). The mixture was put into an incubator at 50° C., and the storage stability of the paint was examined. As a result, even after the lapse of 30 days, the paint was not gelled and cured.

EXAMPLE 5

155.6 g of quatenary ammonium salt-type cationic surface active agent, dodecyldimethylammonium chloride (CATION-2DB, product of NIPPON OIL & FATS CO., LTD. effective component=52%) was added to 1000 g of the anionic ceric oxide sol ($CeO_2$=7.7%, P=1.3%, $P/CeO_2$ molar ratio=0.94) of the invention obtained in Example 3 to form a precipitate.

Then, methyl isobutyl ketone was added as a solvent and a solvent extraction treatment was performed to separate the sol into the organic solvent layer to obtain an organo-ceric oxide sol of the invention.

The sol of the invention was distilled to remove the organic solvent, and after drying it was analyzed. It was found to comprise 43.6% of $CeO_2$, 7.4% of P and 37.4% (85.8% based on $CeO_2$) of didecyldimethyl-ammonium.

When this dried product was dispersed in xylene so that the $CeO_2$ concentration became 5%, it became a sol having excellent transparency again.

Furthermore, the transparency of the organo-ceric oxide sol of the invention dispersed in xylene was measured in accordance with a measuring method A (method of measuring light transmittance and full integral light reflectance) described in JIS K-7105 (testing methods for optical characteristics of plastics) by using an integrating sphere-type light transmittance measuring device. The full light transmittance was 52%, and the diffused transmittance was 8%.

EXAMPLE 6

The anionic ceric oxide sol of the invention ($CeO_2$=20%, $P/Ceo_2$ molar ratio=0.31, pH=8.5) obtained in Example 1 was used and diluted with water so that the $CeO_2$ concentration became 10%. 4.8 g of this sol was added to 40 g of an acrylic-styrene emulsion (BONCOAT 880, non-volatile content 50%, product of DAINIPPON INK & CHEMICALS, INC.), which was an anionic aqueous emulsion resin. The mixture was put into an incubator at 50° C., to examine the storage stability of the emulsion. As a result, the emulsion using the sol of this invention did not gel or cure even after the lapse of 30 days.

For comparison, 4.8 g of the cationic ceric oxide sol ($CeO_2$=10%), the conventional sol used in Example 1 was added to 40 g of the acrylic-styrene emulsion in the same way as above. This emulsion was immediately destroyed and gelled and became non-uniform.

EXAMPLE 7

The anionic ceric oxide sol ($CeO_2$=20%, $P/CeO_2$ molar ratio=0.31, pH=8.5) of the invention obtained in Example 1 was used and diluted with water so that the $CeO_2$ concentration became 10%.

100 g of the above sol was added to a mixed solution obtained from 4 g of a tertiary amine-type cationic surface active agent, polyoxyethylene octadecylamine (NIMENE S204, effective component 100%, product of NIPPON OIL & FATS CO., LTD.) and 160 g of a mixed solvent (HIGHALOM S 9%, product of NIPPON OIL CO., LTD., xylene 54%, diisobutyl ketone 37%). The mixture was put into a separating funnel (1l) and the sol was extracted into the-organic solvent layer to obtain an organo-ceric oxide sol [$CeO_2$=5.8%, P=0.3%, $P/CeO_2$ molar ratio=0.29, polyoxyethylene octadecylamine=1.9% (32.8% based on $CeO_2$)].

When 30 parts of the above organo-ceric oxide sol was added to 100 parts of silicon-acrylic paint (Acrydic BZ-1161, non-volatile content 44%, product of DAINIPPON INK & CHEMICALS, CO., LTD.), a slight turbidity appeared. But a coated film (20 μm) to which this paint was applied had excellent transparency.

EXAMPLE 8

7800 g of hydrochloric acid (HCl=2%) was added to 1000 g of the wet cake obtained in Example 3. The mixture was heat-treated for 1 hour at 90° C. to obtain cationic ceric oxide sol ($CeO_2$=2.8%; conventional sol).

To 1760 g of this sol 36.0 g of ortho-phosphoric acid (85% of $H_3PO_4$) was added so that the $P/CeO_2$ molar ratio became 1.1 and furthermore, a 10% potassium hydroxide solution was added to adjust the pH of the solution to 8.5. By using an ultrafiltration apparatus, the solution was washed and concentrated to form ceric oxide sol of the invention ($CeO_2$=5.0%, P=0.9%, $P/CeO_2$ molar ratio=1.0).

EXAMPLE 9

22.3 g ($P/CeO_2$ molar ratio=0.30) of diammonium hydrogenphosphate powder was added to 1000 g of the cationic ceric oxide sol (CeO=9.7%; conventional sol) produced under the same conditions as in Example 2. Furthermore, 28% of aqueous ammonium was added to adjust the pH to 10. The solution was desalted by using an ultrafiltration apparatus. Furthermore, it was washed and concentrated to obtain a ceric oxide sol ($CeO_2$=15%, P=0.6%, $P/CeO_2$ molar ratio=0.22, pH 9.8) of the invention.

EXAMPLE 10

2 g of sodium tripolyphosphate ($P/CeO_2$ molar ratio=0.30) was added to 100 g of the cationic ceric oxide sol ($CeO_2$=9.7%; conventional sol) produced under the same conditions as in Example 2. Furthermore, a 10% sodium hydroxide solution was added to adjust the pH to 9.0.

The above sol suspension was added to a solution prepared by mixing 5.4 g of secondary amine-type cationic surface active agent, oxyethylene dodecylamine (NIMENE L-201, effective component 100%, product of NIPPON OIL & FATS CO., LTD.) with 100 g of toluene. The mixture was put into a separatory funnel (1 l) and the sol was extracted into the toluene layer to obtain an organo-ceric oxide sol [$CeO_2$=5%, P=0.2%, $P/CeO_2$ molar ratio=0.22, dodecylamine=1.4% (28% based on $CeO_2$)] of the invention.

EXAMPLE 11

Acetic acid (7.3 g) was added to 200 g of the gel slurry ($CeO_2$=10.5%) obtained in Example 2. The mixture was hydrothermally treated at 180° C. for 6 hours in an autoclave to obtain a cationic ceric oxide sol (conventional sol).

0.6 g of sodium ultrapolyphosphate [$Na_2H_2(PO_3)_4$] was added to 200 g of this cationic ceric oxide sol ($CeO_2$=10.1%). Furthermore, 3 g of quaternary ammonium salt-type cationic surface active agent, tetradecyldimethylbenzyl ammonium chloride (CATION M2-100, effective component 100%, product of NIPPON OIL & FATS CO., LTD.) was added to this solution to form a precipitate.

The precipitate was filtered and washed, and dried at 60° C.

This dried product contained 89% of $CeO_2$, 0.8% of P and 8.9% (10% based on $CeO_2$) tetradecyldimethylbenzyl ammonium. Dispersion of it in toluene yielded an organo-ceric oxide sol of the invention.

EXAMPLE 12

30 g of quaternary ammonium salt-type cationic surface active agent, dodecylbenzyldimethyl ammonium chloride (CATION F2, effective component 50%, product of NIPPON OIL & FATS CO., LTD. was added to 200 g of the ceric oxide sol of the invention ($CeO_2$ =5.0%, P=0.9%, $P/CeO_2$ molar ratio=1.0) obtained in Example 8 to obtain a precipitate.

The precipitate was filtered and washed then dried at 60° C. This dried product contained 40% of $CeO_2$, 7.2% of P, and 40% (100% based on $CeO_2$) dodecylbenzyldimethyl ammonium. Dispersion of this dried product in toluene gave an organiceric oxide sol of this invention.

As described in detail above, the present invention is obtained by adding phosphoric acid and/or phosphate to ceric oxide sol in a $P/CeO_2$ molar ratio of 0.05 to 1.0. The sol of this invention dissolves easily in an emulsion paint and a dispersion paint, which dissolution was heretofore difficult, and shows excellent storage stability. By adding 10 to 100% of a cationic surface active agent (based on $CeO_2$) to this sol, a stable ceric oxide sol forms when dispersed in an organic solvent. Accordingly, when this sol is mixed with a room temperature curable paint, especially when the paint cured with curing agent such as isocyanate, the paint does neither increase in viscosity nor cure, and has excellent stability.

The sol of this invention may be applied to not only these paints but also to various types of resins for paints. Examples of the resins are vinyl chloride resin, chlorinated vinyl chloride resin, polyethylene resin, polyester resin, polystyrene resin, acrylonitrilene-styrene resin, vinylidene chloride resin, vinyl acetate resin, polyamide resin, polyacrylate resin, polyimide resin, polycarbonate resin, butadiene resin, polyacetal resin, chlorinated polyethylene resin, chlorinated polypropylene resin, ionomer resin, ethylene-vinyl choloride copolymer resin, ethylene-vinyl acetate copolymer resin, ethylenevinyl acetate-vinyl choloride graft polymer resin, polyphenylene resin, polysulfone resin, methacrylic acid resin, polypropylene resin, acrylic-fluorine resin, acrylic-silicone oligomer, and epoxy-containing silicone-acrylic resin.

The sol of this invention is applicable not only to these paint materials, but also generally and widely to the utility of various ultraviolet absorber materials having ceric oxide as a starting material. Examples of the application include ultraviolet absorption of automobile windowpanes, fluorescent lamps, incandescent lamps, windowpanes for show windows and covers for illuminating lamps, bottles for wines and beer, cosmetics, and protective films for ultraviolet degradable products, but these are not limitative.

What is claimed is:

1. Ceric oxide sol having an organic continuous phase, an average particle diameter of 500 Å or less, and containing a cationic surface active agent and phosphoric acid and/or phosphate in a $P/CeO_2$ molar ratio of 0.05 to 1.0.

2. A sol according to claim 1 wherein the phosphoric acid and/or phosphate is selected from the group consisting of phosphoric acid, condensed phosphoric acids, their alkali metal salts and ammonium salts.

3. A sol according to claim 1 wherein the cationic surface active agent is a quaternary ammonium salt type cationic surface active agent.

* * * * *